United States Patent [19]

Gunter

[11] 4,364,133
[45] Dec. 21, 1982

[54] CAMPER DOOR AND SHOWER SYSTEM

[76] Inventor: Barbara A. Gunter, 253 E. Sunnyside, Houston, Tex. 77076

[21] Appl. No.: 292,589

[22] Filed: Aug. 13, 1981

[51] Int. Cl.³ .............................................. A47K 3/22
[52] U.S. Cl. ......................................... 4/617; 4/602; 4/599; 4/616; 4/612
[58] Field of Search ................... 4/596, 599, 597, 600, 4/602, 603, 612, 615, 616, 617

[56] References Cited

U.S. PATENT DOCUMENTS

| | | | |
|---|---|---|---|
| 1,047,670 | 12/1912 | Masters | 4/617 |
| 1,330,312 | 2/1920 | Figueroa | 4/602 |
| 1,368,237 | 2/1921 | Brockman | 4/617 |
| 2,052,420 | 8/1936 | Peterson | 4/617 |
| 3,381,316 | 5/1968 | Anderson | 4/599 |
| 3,925,828 | 12/1975 | Kim | 4/603 |
| 4,280,643 | 7/1981 | Cordova | 4/612 X |

Primary Examiner—Henry K. Artis
Attorney, Agent, or Firm—Gunn, Lee & Jackson

[57] ABSTRACT

A combination camper door for a camper vehicle, such as a camper shelf or pickup trucks and the like, wherein the camper door is manufactured in such manner as to define a holding tank for water. The camper door is pivotal from a substantially vertical orientation when closed to a substantially horizontal orientation when open. The camper door is provided with a valve controlled shower fitting which extends downwardly in the open position of the door and is interconnected with the water tank so that a person standing beneath the open camper door may manipulate the shower valve and drain water from the holding tank through the shower nozzle for the purpose of taking a shower bath. The camper door is provided with a fill opening interconnected with the water holding tank which is located in the upper portion of the tank in both the open and closed positions of the door, enabling filling of the water holding tank regardless of the position of the door. The door also includes a water drain opening that is located at the lower portion of the water holding tank regardless of the position of the door to thus allow efficient draining of the water holding tank when desired. In its open position, the door may be supported by a conventional spring and latch system or by means of ground engaging support stanchions as desired.

8 Claims, 3 Drawing Figures

CAMPER DOOR AND SHOWER SYSTEM

FIELD OF THE INVENTION

This invention relates generally to recreational vehicles, commonly referred to as "campers" which serve as a temporary habitat for persons enjoying outdoor recreational activities. More specifically, this invention relates to the combination with a camper system of a shower facility to enable camping persons to take shower baths and maintain normal personal hygiene in the outdoor recreational environments or when traveling.

BACKGROUND OF THE INVENTION

A wide variety of camping vehicles are being used at the present time by persons enjoying outdoor recreational activities and traveling. Camper vehicles provide sleeping accommodations and provide food preparation facilities to make camping and traveling activities more pleasant. Since camper vehicles take a wide variety of forms, the term "camper" or "camping vehicle" is intended to include a wide variety of camping vehicles, including camper trailers that are towed, self-contained powered camper vehicles, camping structures that are supported by pickup truck beds and the like.

In many cases, large camper trailers and self-contained camping vehicles are provided with built-in shower facilities to enable persons to take shower baths. These built-in shower facilities require a considerable amount of space, but in large camper vehicles, there is ample space to accommodate built-in shower and toilet facilities. The water supply facilities for camper showers is generally in the form of a holding tank which is sufficiently large as to contain from 20 to 50 or more gallons of water. The camper vehicle is typically provided with sufficient plumbing to distribute water from the storage tank to kitchen, bath and toilet facilities of the camper. This plumbing system is typically provided with a pump or air supply system to cause water to flow from the storage tank to the kitchen, bath and toilet facilities under sufficient pressure that it can be efficiently used.

In the case of small camper vehicles, such as camper shells that are received by the bed portion of pickup trucks and the like, there is typically insufficient space available for provision of kitchen, bath and toilet facilities. When small camper vehicles of this nature are utilized, the users simply are forced to rely on available public facilities for personal hygiene or, suffer the disadvantage of not being able to bathe. It is desirable, therefore, to provide a shower system for camper vehicles and especially small camper vehicles which permits the users thereof to take shower baths in outdoor recreational environments. It is also desirable to provide small camper vehicles with shower facilities which can be made ready for showering within a limited amount of time and thus is easy and pleasant to use.

THE PRIOR ART

As might be expected, shower facilities take a wide variety of forms whether used in conjunction with recreational vehicles or whether used for daily personal hygiene in the home. U.S. Pat. No. 1,330,312 of Figueora discloses portable showering apparatus employing a holding tank that is supported in an elevated position with water being distributed by gravity from a shower nozzle. U.S. Pat. No. 2,466,378 of Charteris discloses a shower stall construction wherein water is supply by gravity from an overhead water storage tank.

U.S. Pat. No. 2,561,265 of Burns discloses a shower facility for a recreational vehicle or trailer house, the apparatus being portable but also being built into the structure of the vehicle such that it is collapsible into a floor compartment and covered by means of a cover plate. U.S. Pat. No. 2,634,425 of Sturwold discloses a collapsible shower structure which is built into a vehicle structure. U.S. Pat. No. 3,265,262 discloses a plastic bag for carrying water on motor vehicles and which may be filled or drained in place.

A portable shower system is also disclosed by U.S. Pat. No. 3,381,316 of Anderson which discloses a portable shower system for a truck mounted camper which utilizes water fed by a pump from a storage tank, with the water being heated by the temperature of the engine coolant of the vehicle.

Another type of portable shower system is disclosed by U.S. Pat. No. 3,925,828 of Kim and which may be set up externally of a vehicle to enable outdoor showering. The apparatus of Kim obviously requires a significant amount of time for assembly and disassembly and thus is considered disadvantageous.

SUMMARY OF THE INVENTION

It is, therefore, a primary feature of the present invention to provide a novel shower system which may be combined with the structure of a small camper vehicle and which facilitates efficient showering by users in an outdoor recreational environment.

It is also a feature of this invention to provide a novel shower system for camper vehicles which does not require internal camper storage space therefore.

It is an even further feature of this invention to provide a novel shower system for small camper vehicles which requires little time for set up and take down and thus does not constitute an annoyance during camping activities.

Among the several features of this invention is contemplated the provision of a novel shower system for small camper vehicles which does not require separatable parts that may become lost or misplaced as outdoor recreational or traveling activities are being conducted.

It is a further feature of this invention to provide a shower system for camper vehicles which is incorporated with a camper door and which does not interfere with conventional camping activities involving opening and closing of the camper door.

It is also a feature of this invention to provide a novel shower system for small camper vehicles which is of simple nature, is reliable in use and low in cost.

Briefly, the present invention involves the provision of a camper door for a camper vehicle such as a small camper shell that is located in the bed portion of a pickup truck. The door is pivotally connected at the upper portion of the camper structure and is pivotal from a generally vertically oriented position when closed to a generally horizontally oriented position when open. The camper door is constructed in such a manner as to define a water holding tank therein that contains a sufficient quantity of water to enable two or more persons to take shower baths. To the inside portion of the door is secured a valve controlled shower nozzle that is in communication with the water storage tank. The shower nozzle is directed downwardly in the open position of the door and may be manipulated by the user to enable gravity fed distribution of water through the shower nozzle to the user. The door structure also incorporates a drain plug or fitting which may be utilized to drain the water storage tank in the event such draining is desired. Tank filling apparatus is connected to the outer surface of the door structure and is in communication with the water storage tank, thereby enabling the storage tank to be filled. The tank filling apparatus is located at the upper portion of the door regardless of the position of the door, thus enabling the tank to be filled with the door open or closed. The drain fitting is located at the lower portion of the door either in the open or closed positions thereof to facilitate efficient draining of the holding tank if desired.

BRIEF DESCRIPTION OF THE DRAWINGS

So that the manner in which the above recited features, advantages and objects of this invention, as well as others which will become apparent, are attained and can be understood in detail, a more particular description of the invention briefly summarized above may be had by reference to the embodiments thereof that are illustrated in the appended drawings, which drawings form a part of this specification. It is to be noted, however, that the appended drawings illustrate only typical embodiments of the invention and are not to be considered limiting of its scope, for the invention may admit to other equally effective embodiments.

For a better understanding of this invention, as well as other objects and further features thereof, reference is made to the following detailed description to be read in conjunction with the accompanying drawings, wherein.

DETAILED DESCRIPTION OF PREFERRED EMBODIMENTS

Figure 1:
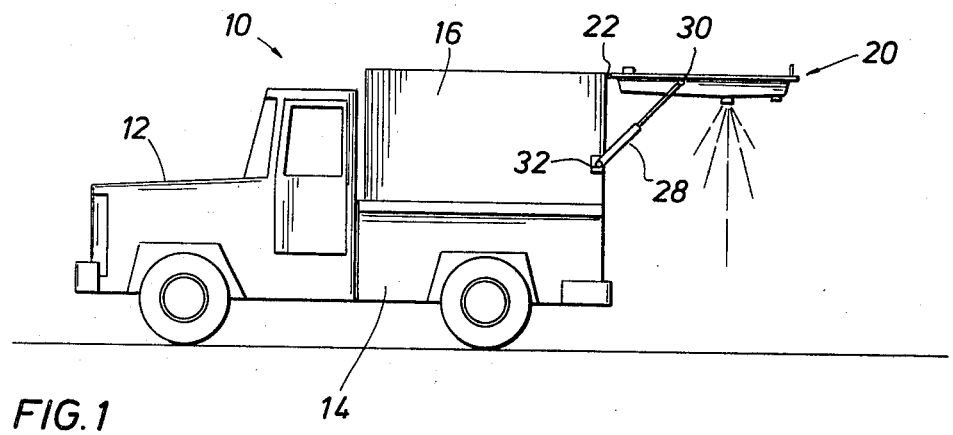
FIG. 1 is an elevational view of a pickup truck and camper assembly having a camper door constructed in accordance with the present invention, which door is shown in the open position thereof to facilitate use of the shower apparatus for personal hygiene.

Referring now to the drawings and first to FIG. 1, there is shown a camper vehicle generally at 10 which comprises a conventional pickup truck 12 having a bed portion 14 to which is secured a camper structure 16. The camper structure 16, although shown as a camper shell, may take any other suitable camper form within the spirit and scope of this invention. For example, the camper 16 may be of the cab-over type which is supported in and attached to the bed portion of a pickup truck such as truck 12. The camper 16 may be of the trailer type, if desired, which is towed from place to place by any suitable automotive vehicle.

Regardless of the character of the vehicle and camper, the camper incorporates an access opening or door that provides ingress to and egress from the camper 16. To provide a closure for the access opening, the camper structure 16 is provided with a door shown generally at 20 and which is pivotally interconnected at the upper portion of the camper 16 by means of a hinge 22 or other suitable pivot connection, enabling the door 20 to be pivoted about a generally horizontal axis from the upper portion of the camper structure.

Figure 2:
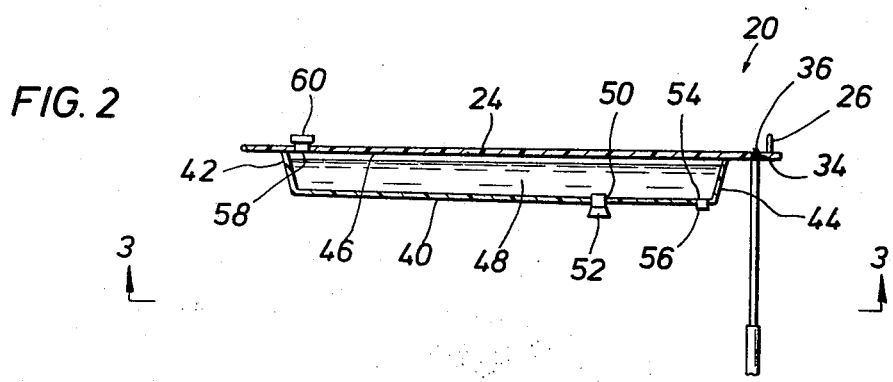
FIG. 2 is a sectional view of the camper door structure of FIG. 1 illustrating the structure thereof in detail.
Figure 3:
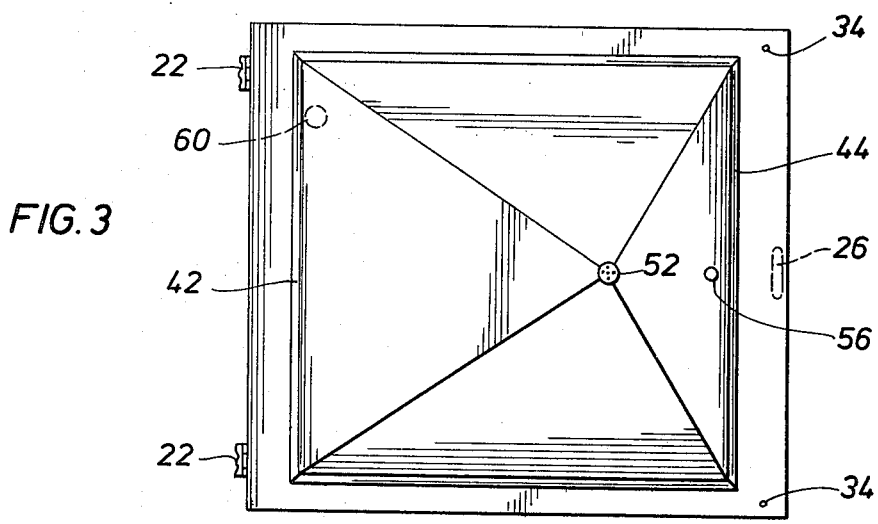
FIG. 3 is a bottom view of the camper door of FIGS. 1 and 2, taken along line 3—3 of FIG. 2.

As illustrated in FIG. 2, the camper door 20 incorporates an outer wall structure 24 that is of sufficient dimension to form a closure for the access opening. At the lower portion of the outer wall structure is provided a handle structure 26, enabling the user to grasp the handle and raise the door 20, thus pivoting it about its hinge or hinges 22 when accomplishing opening or closing movement. The door 20 is adapted to be positioned in a substantially vertically oriented position when closed and, as illustrated in FIG. 1, is positionable in a substantially horizontally oriented position when open. The outer wall structure 24 of the door may be provided with any suitable lock mechanism, not shown, to render the camper 16 secure when the camper door is closed.

When the camper door 20 is in the open position, as shown in FIG. 1, it may be supported in any one of a number of suitable ways. For example, as shown in FIG. 1, telescoping structural support members 28 are provided having one extremity 30 thereof pivotally secured to the door 20 while the opposite extremity 32 is pivotally secured to the camper structure 16. The collapsible support structure 28 is capable of being locked in the extended position thereof, as shown in FIG. 1, to enable the door 20 to be supported in the position shown. When unlocked, the door support structure 28 will collapse, thereby enabling the camper door to be simply and efficiently shut. The door support structure 28 may incorporate internal springs, if desired, to develop a spring force offsetting the weight of the camper door 20. In the alternative, as shown in FIG. 2, the camper door 20 may be formed to define openings 34 at the lower portion thereof within which are received upper portions 36 of stanchion members 38. If desired, the stanchion members may be of two piece, telescoping relation, thus enabling them to be positioned so as to support the door structure 20 in appropriate position with respect to the ground upon which the user stands. This feature will effectively accommodate circumstances wherein the terrain may be unlevel. The stanchion members 38 are easily stored internally or externally of the camper vehicle assembly.

As explained above, it is desirable to provide the door structure of the camper vehicle with the capability of storing a quantity of water which may be utilized for the purpose of shower baths. As shown in FIG. 2, the camper door structure 20 defines a tank enclosure having a side wall 40 that is maintained in spaced relation with the outer wall 24. End walls such as shown at 42 and 44 are formed integrally with the tank wall 40 and are secured in sealed relation to the inner surface portion 46 of the outer wall 24. The tank wall 40 and its end walls are of generally rectangular form and are of smaller dimension than the dimension of the outer wall 24 and thus cooperate with the outer wall to define a water storage chamber 48 that is of generally rectangular form and is of smaller dimension than the dimension of the outer wall 24. Depending upon the size of the camper door structure 20, the water containing storage chamber 48 will be of a size to contain several gallons of water, thus providing sufficient water to allow two or more persons to take shower baths.

To facilitate control of showering by the user, the tank wall 40 is formed to define an aperture 50 within which is received a valve controlled shower nozzle 52. By manually manipulating the valve controlled shower nozzle, the user is enabled to control gravity fed sprinkling of water from the shower nozzle as desired. The shower nozzle 52 is positioned in sufficiently spaced relation with respect to the end portion of the camper vehicle to enable the user to stand freely and shower without interference from the camper vehicle.

Under some circumstances, it may be desired to drain the water storage chamber 48. The tank wall 40 is, therefore, formed to define a drain opening 54 which is ordinarily maintained closed by means of a drain plug 56. Upon removal of the drain plug 56, any water contained within the storage chamber 48 will be efficiently drained. If desired, the drain control apparatus may conveniently take the form of a valve controlled drain, thereby enbabling the user to simply open the drain valve if draining of the storage chamber is desired. This feature would prevent the tank drain apparatus from being lost or misplaced such as shown the user should forget to replace the drain plug after draining the tank. The drain opening 54, of the storage tank, is located at the lower portion of the tank regardless of the position of the door structure 20. As shown in FIG. 2, the door structure is in its open position, being maintained open by the support stanchions 38. In the event the door is pivoted downwardly to its closed position, the drain opening 54 again will be located at the lower most portion of the tank, therefore, permitting efficient draining of the water storage chamber in the event such is desired.

In order to fill the water storage chamber 48, the outer wall structure 24 of the door 20 is formed to define a fill opening 58 which communicates with the interior of the water storage chamber. A fill fitting 60 is secured to the outer wall structure of the door and defines an inlet opening through which water may be introduced into the storage chamber 48. The fill fitting 60 may be provided with a suitable closure that may be removed for efficient filling operations. To permit filling of the water storage chamber 48 regardless of the position of the door structure 20, the fill opening 60 is located at the upper portion of the outer wall 24, near the axis of rotation defined by the hinges 22. With the door structure in the open position as shown in the drawings, the closure of the fill fitting may be removed and water may be efficiently introduced. Under circumstances where the door structure is in its closed or vertically oriented position, the location of the fill fitting 60 will still be at the top portion of the storage chamber 48 of the tank. Again, the closure of the fill fitting may simply be removed and water introuduced into the water storage chamber.

In view of the foregoing, it is respectfully submitted that the present invention is well adapted to attain all of the objects and features hereinabove set forth, together with other features which are inherent in the nature of the apparatus involved. Although the movable water storage tank is shown to be in the form of a camper door, it is to be understood that it may also take the form of a pivotally movable tank structure that is a part of the exterior structure of the camper and is simply pivoted to the position shown in the drawings when showering is desired. For example, the side portion of the camper structure may incorporate a generally rectangular receptacle within which may be pivotally received a water storage tank having an outer wall surface that forms a portion of the outer wall structure of the camper.

These examples and the foregoing discussion are intended as exemplary only and are not intended to limit the scope of the invention in any manner whatever.

I claim:

1. In a camper vehicle used for recreational purposes, the improvement comprising:
   a water storage tank being pivotally connected to the exterior portion of said camper vehicle and defining a water storage chamber, said water storage tank being positionable to a substantially horizontal position and a substantially vertical position, when in the vertical position said water storage tank defines a door for said camper vehicle, and
   shower head means being secured to said water storage tank and being in communication with said water storage chamber, said shower head means being manually controllable to drain water from said water tank means by gravity to enable a person standing beneath said horizontally positioned door to take a shower bath.

2. The improvement of claim 1, wherein:
   tank filling means is interconnected with said water tank and is accessible from the exterior of said water tank, filling means being located at the upper portion of said water tank at both the vertical and horizontal positions of said water storage tank.

3. The improvement of claim 1, wherein:
   tank drain means is interconnected with said water tank and is located at the lower portion of said water tank at both the vertical and horizontal positions of said water tank.

4. The improvement of claim 1, wherein:
   tank filling means is interconnected with said water tank and is accessible from the exterior of said water tank, filling means being located at the upper portion of said water tank at both the vertical and horizontal positions of said water storage tank,
   tank drain means is interconnected with said water tank and is located at the lower portion of said water tank at both the vertical and horizontal positions of said water tank.

5. The improvement of claim 1, wherein:
   said water tank is pivotally connected to the upper portion of said camper vehicle and is pivotal about a generally horizontal pivot axis during movement to said vertical and horizontal positions.

6. The improvement of claim 1, wherein said camper is formed to define an access opening and said improvement further comprises;
   said water storage tank forming a door for aid access opening, said door being closed at said vertical position of said tank and open at said horizontal position of said tank.

7. The improvement of claim 6, wherein said water tank comprises:
   an outer wall of a size and configuration forming a closure for said access opening; and
   a tank wall having integral side walls, said side walls being secured to said outer wall and maintaining said tank wall in spared relation with said outer wall, said outer wall, tank wall and side wall cooperating to define said water storage chamber.

8. The improvement of claim 7, wherein:
   tank filling means is provided in said outer wall and is in communication with said water storage chamber and positioned at the upper portion of said water storage chamber in both the vetrical closed and horizontal open positions of said door; and
   tank drain means is provided in said tank wall and is located at the lower portion of said water storage chamber at both the vertical closed and horizontal open positions of said door.

* * * * *